Figure 1:
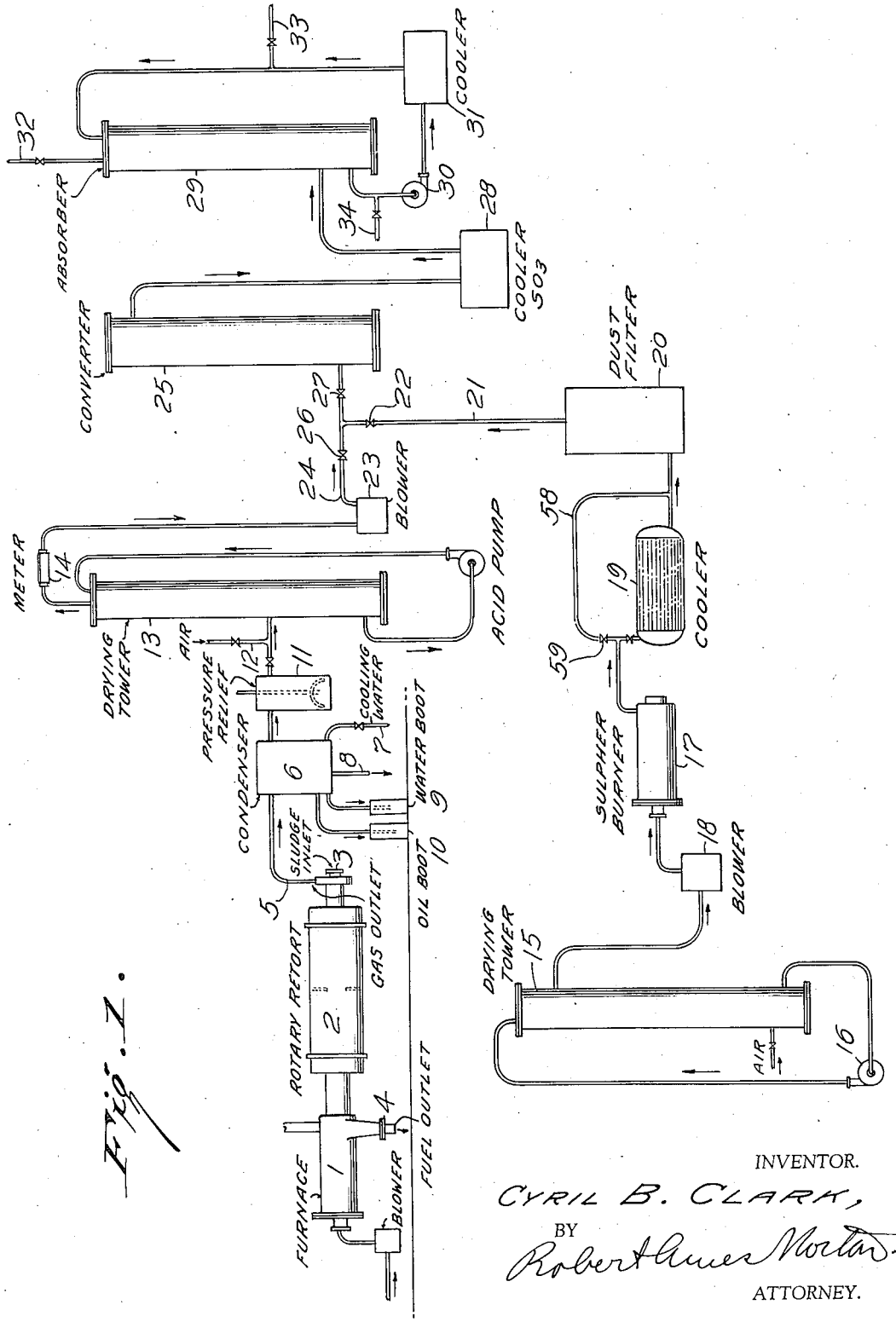

Patented June 16, 1936

2,044,419

UNITED STATES PATENT OFFICE 2,044,419

PRODUCTION OF SULPHURIC ACID BY THE CONTACT PROCESS

Cyril B. Clark, Scarsdale, N. Y., assignor to American Cynamid Company, New York, N. Y., a corporation of Maine Application May 18, 1933, Serial No. 671,647

6 Claims. (Cl. 23—177)

This invention relates to the production of contact sulphuric acid and more particularly to the production of sulphuric acid from a combined plant in which a portion of the sulphur-containing material which is used as a source of $SO_2$ is a sulphuric acid sludge from the the sulphuric acid purification of hydro-carbonaceous material, such as for example, petroleum products.

The refining of petroleum products and similar hydro-carbonaceous substances generally requires the step of treating these substances with concentrated sulphuric acid. In this operation an acid sludge residue is obtained which has hitherto been of relatively little value and has resulted in serious problems in regard to its safe disposal. Attempts have been made to dispose of this sludge by burning it but such a procedure is generally unsatisfactory due to the sticky, acid, odorous character of the material which makes it difficult to handle, the corrosive action of the acid compounds on the burner equipment and the steam boiler when it is used as a fuel for producing power, and due to the large volume of gases evolved containing oxides of sulphur and which may cause a nuisance in thickly populated communities and even in isolated locations may damage vegetation. Due to its obnoxious properties it cannot be dumped into streams. In many cases practice has, therefore, been to transport it to some out of the way spot and deposit it in some depression far from localities where it can do no harm. Therefore the disposal of acid sludge has presented a serious problem to oil refineries.

Several processes have been proposed in the past for utilizing acid sludges as sources of $SO_2$. These processes in general consist in decomposing the acid sludge by means of heat with concomitant reduction of a greater or lesser proportion of the $SO_4$ compounds by the hydro-carbonaceous material to form a gas containing sulphur dioxide and the utilization of this sulphur dioxide gas for producing sulphuric acid. As the demand in oil refineries is usually for strong acid, the contact sulphuric acid process, which produces this grade of acid, is particularly applicable from the oil refiners standpoint. Until recently, none of the processes proposed have proven commercially successful.

The process described by Hechenbleikner, in U. S. application Serial No. 568,050, filed October 10, 1931, now Patent No. 1,953,225, dated April 3, 1934; is the first to achieve notable commercial success. In this process the acid sludge is heated in rotary kilns by direct contact with hot combustion gases which may be produced either from fuel oil material or if desired, from brimstone or sulphur bearing materials. It has also been recently proposed to thermally decompose certain types of acid sludge in externally fired retorts with violent agitation, while keeping the sludge liquid by diluting with petroleum fractions.

Further complications are encountered because the gas is cold which necessitates heat exchange equipment in the contact plant and the $SO_2$ content may fluctuate within fairly wide limits since the disengagement of $SO_2$ in the sludge still or kiln varies, particularly in batch decomposition processes. Even when a continuous process is employed such as described in the Hechenbleikner patent above referred to, the $SO_2$ evolution may fluctuate because of the non-uniform composition of the sludge treated.

It has been proposed to overcome the disadvantage due to the presence of hydrocarbons by completely removing the same. In my co-pending application Serial No. 670,123 filed May 9, 1933, now Patent 2,019,554, issued Nov. 5, 1935, I have described a process involving a partial removal of the hydrocarbons to the point where the residue on burning will not give over 23–28 mg. of water per cu. ft. of gas. These methods require additional equipment whether the removal of the hydrocarbon vapors is by refrigeration and solution in a scrubbing liquid or by more or less complete burning in a precombustion furnace. Even when the hydrocarbons are removed, completely or partially, so as to result in a gas which will not give trouble after conversion because of acid mist, the gas is relatively cold and the $SO_2$ content may fluctuate within considerable limits.

The present invention avoids the disadvantages referred to above and further reduces the cost of producing sulphuric acid from acid sludge where the demand for sulphuric acid and the supply of acid sludge are such that the present invention can be used. According to the present invention, instead of running a sulphuric acid contact plant on acid sludge $SO_2$ alone, a plant is operated with a combination of two sources of $SO_2$, one being acid sludge, the other either sulphur or sulphide ore. It is, of course, possible to practice the present invention with all three sources of $SO_2$ gases going into a single conversion plant, but in normal cases there is no advantage in using both sulphur and sulphide ores together with acid sludge as $SO_2$ sources.

In the operation of the present invention, the acid sludge is thermally decomposed by any suitable methods, for example, by the Hechenbleikner process above referred to. The SO₂ gases obtained are freed from most of the water and the condensable hydrocarbons and are then mixed with the gas stream from a sulphur burner or from an ore burner, if necessary, with suitable addition of fresh air. The combined gases are then passed through a converter which may be operated with either a platinum or vanadium catalyst, but which preferably is operated with a vanadium catalyst, and the SO₃ formed is absorbed in absorption towers in the usual manner. By combining gases coming from the acid sludge still or kiln with dry gases which are produced by a sulphur or ore burning system a mixed gas is obtained which can be so adjusted by varying the relative amounts of SO₂ from the acid sludge and SO₂ from sulphur or ore so that the content of uncondensable hydrocarbons is such as to produce an amount of water in the converter not exceeding 30 mg. per cu. ft. At the same time, the SO₂ concentration is regulated, which is of great importance because the fluctuation of the SO₂ content of the gas from the acid sludge kiln is smoothed out or equalized. This adjustment of SO₂ concentration is effected in two ways. In the first place, the large amount of gases coming from the sulphur or pyrites burner, which are of uniform SO₂ content, act as a fly wheel, making fluctuations of SO₂ content in the gases from the acid sludge kiln a much smaller percentage fluctuation in the total gas. In the case of a sulphur burner it is also easily possible to vary the concentration of SO₂ from the sulphur burner either by producing a gas stronger than necessary and admitting varying quantities of additional air or, although less effectively, by varying the concentration of SO₂ gases delivered by the sulphur burner itself.

While it is a preferred embodiment of the present invention to utilize the SO₂ gases from the acid sludge still without removal of the uncondensable hydrocarbons, it should be understood that the invention in its broader aspects is not limited thereto and if desired the hydrocarbon gases which are uncondensable may be partially or wholly removed before mixing with the gases from a pyrites or sulphur burner. This modification, of course, eliminates one function of the present invention, namely, the dilution of the hydrocarbon gases to harmless concentrations without the use of special hydrocarbon removing equipment. However, the important functions of adjustment of SO₂ and, as will be described in greater detail below, the adjustment of temperature, still remain, and a reliable and economical utilization of acid sludge as a source of SO₂ is realized.

While the removal, partly or completely, of uncondensable hydrocarbons from the SO₂ stream from the acid sludge still will usually be unnecessary, it becomes of real importance when it is desired to produce high strength oleum. Even if all of the hydrocarbons are removed from the acid sludge SO₂, this gas after passing through the condenser, is still saturated with water vapor under those conditions, and the drying tower acid absorbs the water vapor from the saturated gas stream. This amount of water is so great that if the drying tower acid is circulated as part of the acid absorption system it will greatly limit high strength oleum which can be produced even though no further water is generated by combustion of hydrocarbons. When, however, the present process is used, particularly, with sulphur burning equipment, the water introduced into the drying acid per unit of SO₂ is relatively small and the SO₂ from the sulphur burning equipment produces additional SO₃ which permits obtaining high strength oleum in greater quantity. Thus, when oleum is to be produced in large quantities the present process possesses the additional important advantage that the water balance is adjustable and a product, oleum, can be obtained in amounts which would be impossible with the ordinary system using only gases from the ordinary acid sludge distillation retort. This special modification of the present invention, is therefore, of considerable importance for installations where the production of oleum is an important factor, and it is significant that this added flexibility is obtained without further complications and the system can be operated with all the important advantages of simplicity for the production of 98% acid during most of the time and yet on short notice can deliver oleum when a sudden demand for this product arises.

While the present invention is not broadly concerned with the source of additional SO₂ gases particular advantages are obtained when a sulphur burner is employed or where an ore burner is used in a process not requiring the cold scrubbing of the gases. The gases from a sulphur burner, are, of course, at very high temperature and require no purification with either platinum or vanadium catalysts. The SO₂ gases from the acid sludge still, are cold because they have passed through a water condenser and an acid drying tower. Also, the additional air which must be added at some point in the process is normally cold. This has necessitated rather elaborate heat exchangers when acid sludge is the only source of SO₂ for a particular plant and since the heat exchangers for the most part, involved utilizing the heat of conversion of the SO₂ to SO₃ in the converter, they were particularly open to corrosion difficulties if the water content or hydrogen content of the gases should rise to the point where there is danger of mist formation. Also the varying concentrations of SO₂ given off by the acid sludge still rendered the temperature control in the converter rather unsatisfactory. This modification of the present process utilizes the heat of a sulphur burner to supply the necessary heat to the cold SO₂ gases from the acid sludge still, without the use of a heat exchanger through which converted SO₃ passes. This is an important advantage of this particular modification of the present invention because, as will be pointed out below, it renders the combined process useful with amounts of hydrocarbons which will result in the production of acid mist.

The additional advantage of temperature equalization which is obtained by the modification of the present invention using a sulphur burner, is usually not enjoyed when an ore burner is used or when SO₂ from smelters is employed. This is due to the fact that the ordinary process employing an ore burner or smelter gases involves a purification system in which the gases are scrubbed and therefore, are reduced in temperature in the same way as the gases from an acid sludge still. It is however, possible to operate an ore burning system and even under certain circumstances a smelter gas system without cold purification where an effective dust filter is employed and a non-poisoning vanadium catalyst is used in the converters. The acid obtained from such system, of course, is contaminated with arsenic or other volatile metallic poisons, unless the ore happens to be free from such poisons as is the case with certain special pyrite ores. However, arsenic free acid is not necessary, for example, for certain fertilizer processes. In such cases the ore burning equipment may be combined with the acid sludge still and serve to supply the additional heat in the same manner as a sulphur burner and, of course, enjoy the same advantage.

Naturally it is possible to combine an acid sludge still, an ore burner and a sulphur burner into one process, the cold gases from the acid sludge system and from the ore burner system being heated up by the hot gases from the sulphur burner. Such a system while theoretically of interest is usually not warranted because of the additional equipment required. However, in certain cases it may be desirable and is, of course, included as one embodiment of the present invention.

When the uncondensable hydrocarbon gases in the acid sludges $SO_2$ stream are not removed and where it is desired to operate the whole system without production of acid mist, the proportion of the total $SO_2$ supplied from the acid sludge, is, of course, limited since the amount of $SO_2$ supplied either by the burning of sulphur or sulphide ores must necessarily be sufficient to dilute the hydrocarbons or other hydrogen containing gases in the acid sludge $SO_2$ stream to a point where the total amount of water generated in the converter will not exceed the upper limit of approximately 30 mg. per cu. ft. This fact, of course, decreases the proportion of acid sludge which can be utilized and in some cases where a large supply of acid sludge is available and the market for acid is not sufficiently great to permit the combustion of sufficient sulphur or sulphide ore in order to dilute the hydrocarbons below the point where acid mist is formed, it is desirable to employ a modification of the present process in which the proportion of $SO_2$ from the acid sludge is increased. This may be done by reducing the uncondensable hydrocarbon content as described in my copending application above referred to.

The invention has been generally described without reference to particular design of acid sludge decomposition equipment, sulphur or ore burning equipment, etc. It is an advantage of the present invention that in its broader aspects it is not limited to particular apparatus design and can utilize much standard equipment. However, it is desirable to operate the present process with an efficient acid sludge decomposition process and, therefore, the invention will be described in greater detail in conjunction with the drawings which show the process in diagrammatic form, in combination with an acid sludge decomposition system such as that described in the Hechenbleikner patent above referred to.

In Fig. 1 is a diagrammatic elevation of a system combining an acid sludge still and sulphur burning equipment; and,—

Figure 2:
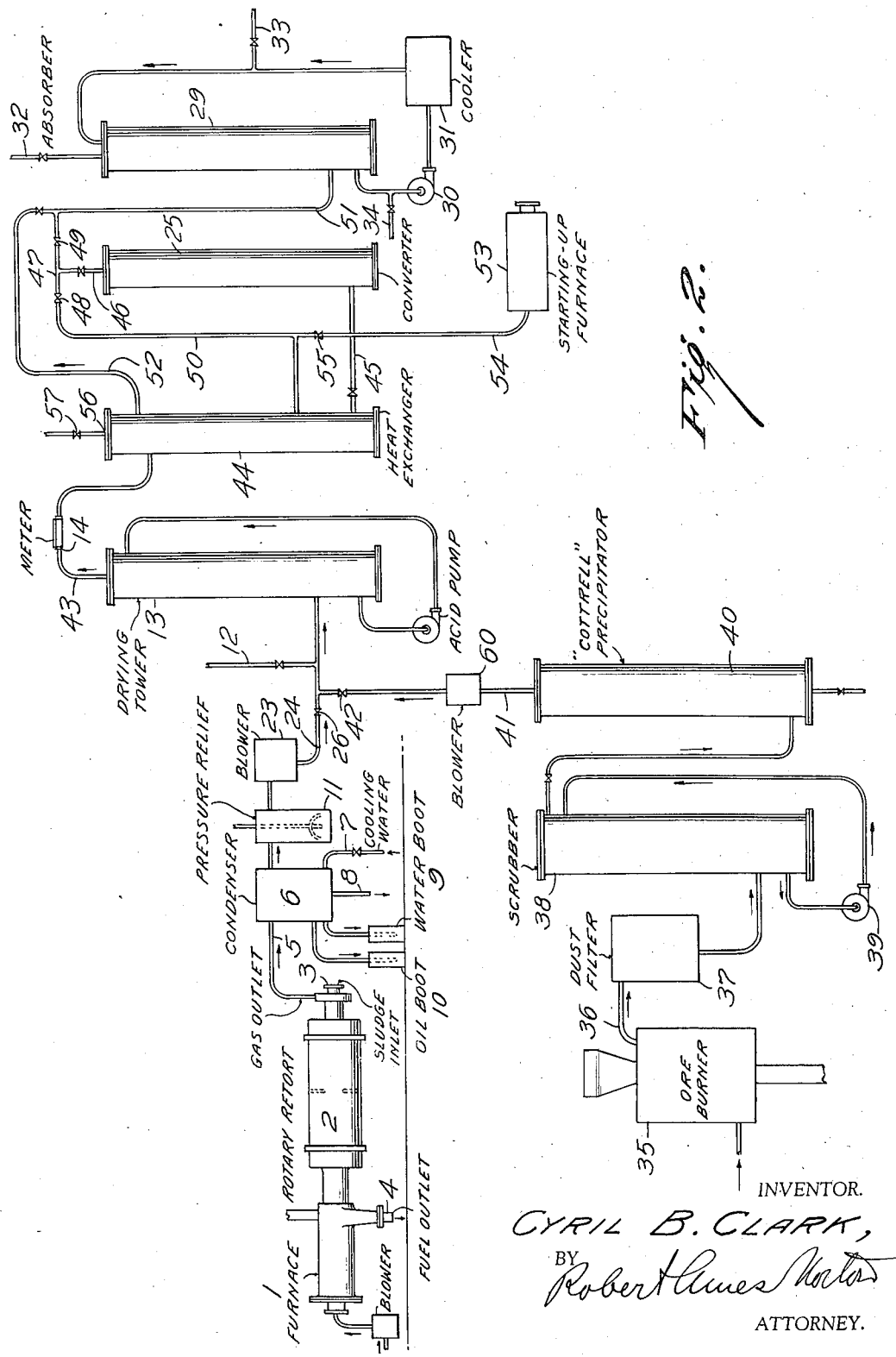

Fig. 2, is a diagrammatic representation of a combined acid sludge decomposing kiln and ore burning system.

In the drawings, the same equipment is given the same reference numeral and it will be noted that the acid sludge decomposition equipment is the same in both figures.

In the modification shown in Fig. 1, fuel is burned in furnace 1 and the gases passed in counter-current to a body of acid sludge in a rotary kiln or retort 2, the sludge entering through the sludge inlet 3 and passing through zones of increasing temperature until it is discharged as a granulatable fuel through the fuel outlet 4. The $SO_2$ gases containing water, hydrocarbons, nitrogen, etc., pass off thru pipe 5, into the water cooled condenser 6, into which cooling water enters through pipe 7 and leaves through pipe 8. Water and heavier condensable hydrocarbons condense out in the condenser and form two layers, the water being removed through the water boot or seal 9 and the oil through the oil boot or seal 10. The partially dried gases then pass through a pressure relief valve 11, are admixed with air through the valved pipe 12 and enter the drying tower 13, where they are dried by a circulation of sulphuric acid. The dehydrated gas stream leaves the top of the drying tower and after passing through a meter 14 enters the suction of the blower 23, from which it is delivered to a pipe 24 leading into the converter 25. The pipe 24 is provided with two valves, 26 and 27.

Air is taken into the dryer 15 of the sulphur burning equipment, which dryer is usually a tower with sulphuric acid circulated by the acid pump 16. The dehydrated air is then forced into a sulphur burner 17 by means of a blower 18. In the sulphur burner $SO_2$ is generated in the concentration desired for producing suitable strength gas after mixing with the $SO_2$ from the acid sludge still. The gases leaving the sulphur burner are of very high temperature and if the proportion of these gases used in the combined process is high, it may be necessary to reduce their temperature somewhat. This can be effected in the cooler 19 which is usually in the form of a boiler and from which the waste heat is recovered in the form of steam. A by-pass pipe 58 controlled by a valve 59 is provided so that a greater or less quantity of the hot gases may be by-passed around the cooler. When in normal operation a portion of the gases pass through the cooler, a very effective regulation of temperature of the combined gases reaching the converter can be effected by regulation of the valve 59 which will determine the amount of cooling given to the gases. After passing through the cooler or by-pass pipe, the gases are run through a dust filter 20 and thence into a pipe 21 which is controlled by the valve 22.

The pipe 21 joins pipe 24 between the valves 26 and 27. Thus, by a suitable adjustment of the valves 22 and 26 the desired proportioning of the gases from the acid sludge still and the sulphur burning equipment can be effected. The adjustment should be such that the desired concentration of $SO_2$, oxygen and hydrogen containing substance, is effected, i. e. that the hydrogen content is reduced below 2 to 3 mg. per cu. ft. of mixed gas. The oxygen and $SO_2$ concentrations are preferably adjusted for best operation of the converter which normally means a 7 to 8% $SO_2$ content. The temperature which is influenced by the proportion of gases from the sulphur burner and the amount of cooling in the boiler 19 is sufficient to assure ignition on entering the converter. For tray-type converters this is preferably about 380 to 400° C., and for internal heat exchange converters of the Jaeger type the entering temperature may advantageously be about 225 to 250° C.

The $SO_2$ in mixed gases in passing through the converter is transformed into $SO_3$ and after leaving the converter the gases are preferably cooled in the SO₃ cooler 28 to a suitable temperature for absorption, for example, from 200 to 300° C. They then pass into the absorbing tower 29, where acid is circulated by means of the acid pump 30, thru acid cooler 31. The exhaust gases pass off to the stack thru the valved pipe 32 and acid is drawn off from the system through the valved pipe 33, dilute acid being introduced into the circuit through the valved pipe 34.

In Fig. 2, the acid sludge still, condenser and pressure relief valve is the same as in Fig. 1, and corresponding parts bear the same reference characters. Instead of discharging from the pressure relief valve into the drying tower, however, the gases pass directly into the blower 23 and are thence forced through the pipe 24 into the drying tower 13, additional air being added through the valved pipe 12. The flow through the pipe 24 is controlled by the valve 26.

Air is sucked through the ore burner 35, by means of the blower 60 and the SO₂ gas formed passes through the pipe 36, dust filter 37, into the scrubbing tower 38. The scrubbing tower is provided with a circulation of dilute sulphuric acid by means of the acid pump 39. The ore gas being undried and containing small amounts of SO₃, some acid mist is formed which is not removed by the scrubber. This mist is taken out by a Cottrell precipitator 40 to which the gas is passed from the scrubber 38. If desired the precipitator may be replaced by a coke box. After leaving the Cottrell or coke box the blower 60 sends the gases through the pipe 41 controlled by the valve 42, the gas stream joining the acid sludge SO₂ gas in pipe 24 just beyond valve 26 and the combined streams, after the addition of air through the valved pipe 12, pass through the common drying tower 13.

The dehydrated mixed gases which have been adjusted for SO₂ concentration by suitable adjustment of the valves 26 and 42, leave the dryer through the pipe 43, pass through the meter 14 and enter the top of the heat exchanger 44 leaving the bottom of the heat exchanger through pipe 45 which leads to the converter 25. In the converter the SO₂ is transformed into SO₃ and the converted gases leave through the valved pipe 46 and are separated into two streams by a T 47, the two legs of which are controlled by valves 48 and 49. A portion of the gases passes through the pipe 50 into the heat exchanger 44. The other portion of the gases passes through the pipe 51 into the absorber 29. The converted gases after preheating the incoming gases in the heat exchanger 44 leave through a valved pipe 52 which joins the pipe 51 just beyond the valve 49. Absorption takes place in the absorber 29 in the same manner as described in Fig. 1.

Since the gases from the scrubber 38 are cold it would be impossible to start up the system without some external preheating of the gases entering the converter. This is provided by a starting furnace 53 which connects to the pipe 50 through a pipe 54 controlled by valve 55. The top of the heat exchanger is also provided with an exhaust pipe 56 controlled by a valve 57. In order to start up, valve 48 is closed and valves 55 and 57 are opened. The starting furnace is lighted and hot combustion gases pass up through the heat exchanger until the temperature is sufficiently high so that SO₂ gases can be preheated to a temperature at which conversion will begin in the converter. Then valves 55 and 57 are closed and valve 48 is opened and the heat exchanger operates thereafter by means of a portion of the converted gases as described above.

The specific embodiments in the two figures of the drawings are typical arrangements illustrating the present invention. It should be understood, however, that the invention is not limited to the details shown and other modifications may be employed. The drawings are, of course, diagrammatic in nature as the invention is not concerned broadly with the particular mechanical design of the individual units of equipment. Any suitable apparatus can be used and the particular type chosen will depend on the conditions of the particular installation. The capacities of the two systems will also vary depending on the amount of uncondensable hydrocarbons given off by the sludge, which in turn will vary with different sludges. Of course, the greater the amount of uncondensable hydro-carbons the larger must be the sulphur burning or ore burning plant, in order to effect sufficient dilution unless the system is to operate on an acid mist producing basis.

The present invention has been described generally in conjunction with an acid sludge decomposition process using ordinary combustion gases and producing an SO₂ gas of moderate strength comparable to that obtained from a sulphur burner or from such types of ore burners as are capable of giving a comparatively strong gas. For certain purposes it may, however, be desirable to combine the acid sludge SO₂ with an SO₂ gas, for example, an SO₂ gas from a smelter, from dilute H₂S gases, or from certain low grade ores, in which the concentration of SO₂ is lower than that desired for efficient operation of the converter and particularly for efficient heat regulation in the converter since difficulties are frequently encountered with a gas which is very weak because of insufficient heat generation during conversion. The present process may be modified to overcome the disadvantages of low strength smelter or other SO₂ gases. This may be effected in two ways; either the SO₂ from the acid sludge, which in some cases will not be sufficiently strong to effect much adjustment upward of the smelter or ore gas may be employed with sufficient hydrocarbon content to assure adequate heat development in the converter or a very strong SO₂ gas may be obtained from acid sludge by utilizing combustion gases from sulphur containing material in order to heat the acid sludge in an internally fired kiln. This modification of the acid sludge process is described in the application of I. Hechenbleikner, Serial No. 575,550 filed November 17, 1931. This results, of course, in a very strong SO₂ gas and can, therefore, serve to adjust the SO₂ content of a smelter gas or ore burning gas which is too low.

Another modified acid sludge process producing strong SO₂ gas is that described in application of Rumple, Serial No. 701,137 filed December 6, 1933. In this process instead of using combustion gases as the heating medium for decomposing the sludge in an internally fired kiln, an SO₂ gas is built up and re-circulated in a continuous cycle through the retort and through continuous or intermittent heat exchangers or stoves which may be fired with any suitable fuel. When SO₂ is thus used a circulating gas stream is produced from which water and oils or condensable hydrocarbons are condensed out after leaving the kiln and the residual gas consists of some 80% to 88% SO₂ with the balance non-condensable hydrocarbon gases, carbon dioxide and the like. A portion of this gas stream, either before or after passing through the heat exchangers or stoves, is continuously removed and passes to the converter after suitable dilution with air. As this is a very strong $SO_2$ gas it may be used to fortify smelter or ore burning gases which are deficient in $SO_2$. This modification of the invention is, of course, also included and is of great practical importance under certain particular conditions. It is a further illustration of the great flexibility of the combined process of the present invention which permits its utilization under the most varying conditions of operation.

The invention is not limited to any particular design of sulphuric acid converter and a tray type of converter may be used or one with an internal heat exchanger, for example, such as described in the patent to A. O. Jaeger, No. 1,660,511 dated February 28, 1929. It should be noted that the temperature to which incoming gases must be heated will be different for the two types of converters. In the case of the tray type converter, the temperature must be high enough to permit immediate ignition. In the case of the converter with internal heat exchanger, the temperature should be such as to satisfactorily cool the catalyst layer. This will normally vary from about 200° C., up to 250° C. or even somewhat higher in the case of relatively dilute gases. In the claims where it is stated that the gases are heated to a temperature suitable for entering the converter, it should be understood that this means a temperature suitable for the particular type of converter used in any given installation.

I claim:

1. A method of producing sulphuric anhydride which comprises subjecting residual sludge from the sulphuric acid purification of hydro-carbonaceous material to thermal decomposition with the formation of a gas containing $SO_2$, removing the major portion of free water vapor and substantially all of the condensable hydrocarbons from said gas, producing an $SO_2$ gas by the combustion of sulphur containing materials included in the class consisting of sulphur and sulphide ores, drying the gas, admixing the two gas streams in such proportions as to produce an $SO_2$ gas having an $SO_2$ and oxygen content suitable for conversion by the contact sulphuric acid process and containing an amount of combustible hydrogen-containing substances sufficiently small so that the hydrogen content on combustion will not yield more than 28 milligrams of water per cubic foot of gas and passing said combined gas over a sulphuric acid contact mass at reaction temperature to produce sulphuric anhydride.

2. A method of producing sulphuric anhydride which comprises subjecting an acid sludge from the sulphuric acid purification of petroleum products to thermal decomposition by direct contact of the sludge with combustion gases at temperatures at which the $SO_4$ compounds of the sludge are reduced to $SO_2$, removing the $SO_2$ gas from the sludge, removing the major portion of free water vapor from said gas while leaving an amount of hydrocarbon therein, such that the gas has combustible hydrogen content in excess of 3 mgms. per cu. ft., producing $SO_2$ gas by the combustion of sulphur containing materials included in the class consisting of sulphur and sulphide ores, drying the gas, admixing the two gas streams in such proportions as to produce an $SO_2$ gas having an $SO_2$ and oxygen content suitable for conversion by the contact sulphuric acid process, the hydrocarbon content being sufficiently diluted so that on combustion the water produced does not exceed 28 milligrams per cubic foot and passing said combined gas over a sulphuric acid contact mass at reaction temperature to produce sulphuric anhydride.

3. A method of producing sulphuric anhydride which comprises subjecting acid sludge from the sulphuric acid purification of petroleum products to thermal decomposition in a retort, the sludge being directly contacted with hot combustion gases, removing $SO_2$ containing gas from the retort, removing the major portion of free water vapor from said gas while leaving an amount of hydrocarbon therein, such that the gas has combustible hydrogen content in excess of 3 mgms. per cu. ft., producing an $SO_2$ gas by the combustion of sulphur in a sulphur burner drying the gas, the concentration of $SO_2$ in said gas being greater than that required for conversion, mixing the two gas streams and adding additional air to adjust the $SO_2$ and oxygen content, the addition of air being varied in proportion to the variation of $SO_2$ evolution from the acid sludge decomposition still mixing the $SO_2$ gases from the sulphur burner with the acid sludge $SO_2$ gases in such proportion as to dilute the hydrocarbon content to a point at which on combustion the water produced does not exceed 28 milligrams per cubic foot and finally passing the combined gases over a sulphuric acid contact mass at reaction temperature to produce sulphuric anhydride.

4. A method of producing sulphuric anhydride which comprises subjecting residual sludge from the sulphuric acid purification of hydrocarbonaceous material to thermal decomposition with the formation of a gas containing $SO_2$, the decomposition being effected in such a manner as to produce a gas containing more $SO_2$ than that corresponding to the normal strength for conversion, removing the major portion of free water vapor from said gas while leaving an amount of hydrocarbon therein, such that the gas has combustible hydrogen content in excess of 3 mgms. per cu. ft., producing a dilute $SO_2$ gas by the combustion of sulphide ores, drying the gas, admixing the two gas streams in such proportion that the $SO_2$ and oxygen content is approximately normal for the contact sulphuric acid process, the amount of sulphide $SO_2$ being sufficient to dilute the combustible hydrogen-containing substances to a point at which on combustion the water produced does not exceed 28 milligrams per cubic foot, and passing the mixed gas at reaction temperature over a sulphuric acid contact mass to produce sulphuric anhydride.

5. A method of producing oleum which comprises subjecting the residual sludge from a sulphuric acid purification of petroleum products to thermal decomposition with the formation of a gas containing $SO_2$, removing the major portion of free water vapor from said gas by condensation and by drying in a sulphuric acid drying tower, producing an $SO_2$ gas by the combustion of a sulphur containing material to form a very high strength $SO_2$ gas, drying the gas, admixing said concentrated $SO_2$ gas with the dehydrated $SO_2$ gas from the thermal decomposition of the acid sludge, and adjusting the oxygen content of the mixture to the proper concentration for conversion, the amounts of $SO_2$ from acid sludge and sulphur-containing substances being sufficient so that the remaining concentration of combustible hydrogen-containing substances in the mixed gas is diluted to a point where on combustion they produce an amount of water not exceeding 28 mgms. per cu. ft. of mixed gas, passing the adjusted gas stream through a contact sulphuric acid converter at reaction temperature and absorbing the $SO_3$ formed in sulphuric acid to form oleum, a sufficient portion of the drying acid from the sulphuric acid drying tower being used in the final absorption system, the amount of $SO_2$ from the combustion of sulphur containing substances being sufficiently large in proportion to the $SO_2$ from the acid sludge decomposition so that the $SO_3$ formed is more than sufficient to react with all of the water abstracted by the portion of the drying tower acid which is used in the absorption system, whereby oleum is produced.

6. A method according to claim 5 in which the second $SO_2$ source is from the burning of sulphur.

CYRIL B. CLARK.